US005483231A

United States Patent [19]

Sasabe

[11] Patent Number: 5,483,231

[45] Date of Patent: Jan. 9, 1996

[54] REMOTE-CONTROL SIGNAL RECEIVER FOR LIMITING RECEIPT OF DATA DURING A BLANKING PERIOD

[75] Inventor: Toru Sasabe, Minou, Japan

[73] Assignee: Matsushita Electric Industrial Company, Ltd., Osaka, Japan

[21] Appl. No.: 65,167

[22] Filed: May 20, 1993

[30] Foreign Application Priority Data

May 22, 1992 [JP] Japan .................................... 4-130405

[51] Int. Cl.[6] .............................. G08C 19/16; H04Q 7/00

[52] U.S. Cl. ................................ 340/825.57; 340/825.64

[58] Field of Search ......................... 340/825.57, 825.63, 340/825.64, 825.2; 375/75, 94, 340, 342, 309, 310; 455/343; 370/102, 111

[56] References Cited

U.S. PATENT DOCUMENTS

| | | | |
|---|---|---|---|
| 4,430,652 | 2/1984 | Rothenbuhler et al. | 340/825.64 |
| 4,449,248 | 5/1984 | Leslie et al. | 455/343 |
| 4,734,881 | 3/1988 | Klein et al. | 395/550 |
| 4,860,005 | 8/1989 | De Luca et al. | 455/343 |
| 4,931,790 | 6/1990 | Kobayashi et al. | 340/825.64 |
| 5,175,441 | 12/1992 | den Hollander | 455/343 |
| 5,199,051 | 3/1993 | Nakabayashi et al. | 375/94 |
| 5,387,906 | 2/1995 | Lee | 340/825.57 |

FOREIGN PATENT DOCUMENTS

| | | |
|---|---|---|
| 0234832 | 9/1987 | European Pat. Off. . |
| 56-125127 | 10/1981 | Japan . |
| 62-11315 | 1/1987 | Japan . |
| 2183694 | 7/1990 | Japan . |

*Primary Examiner*—Donald J. Yusko
*Assistant Examiner*—Edward Merz
*Attorney, Agent, or Firm*—Ratner & Prestia

[57] ABSTRACT

A remote-control signal receiver includes an input apparatus to input remote-control signals consisting of data trains repeated at a predetermined frequency, a data incorporating apparatus by which the remote control data derived from the remote-control signal is incorporated into a micro-computer by using the input apparatus, a setting apparatus by which the blank period between the data trains of the remote-control signal incorporated by using the input apparatus is set, and a limiting apparatus to limit the data incorporation period.

10 Claims, 3 Drawing Sheets

REMOTE-CONTROL SIGNAL RECEIVER FOR LIMITING RECEIPT OF DATA DURING A BLANKING PERIOD

BACKGROUND OF THE INVENTION

This invention relates to a method by which electronic equipment is remote-controlled, and more particularly to a circuit for receiving a remote-control signal consisting of a radio wave, an infrared wave, or a wave of some other medium.

A remote-control signal to control electronic equipment is generally transmitted from a remote transmitter, and is received at a receiver incorporated in the equipment to be controlled. The received remote-control signal is then decoded into a series of data values in order to identify the equipment to be controlled and the type of operation commanded by the remote-control signal.

This series of operations is generally performed by a micro-computer provided in the receiver. The micro-computer is equipped with an input terminal dedicated to receive the remote-control signal, and the signal is incorporated in the micro-computer by means of interruption processes.

In a control system, the remote-control signal consists of pulse trains, and the interruption process is triggered upon detecting the very first edge of the received pulses. After this, the remote control data are successively incorporated into the micro-computer while the widths of remote-control pulses are determined by means of a timer means.

In another control system, typical predetermined patterns of the remote control pulses are stored in the micro-computer, and the interruption process is automatically triggered to start the interruption process when the pattern of the received pulse train is found to be identical with one of the stored patterns.

However, as in the case of conventional remote controllers, when the remote control pulses consist of a series of remote control codes repeated at fixed intervals, the received remote-control signal inevitably contains data blank periods between the repeated data trains. Therefore, the data incorporating circuit stays in an active state even when the circuit is in the data blank period. Thus, the chances of misoperation caused by an external random noise occurring in the data blank period are high with this circuit construction.

Moreover, with the interruption process employed in most of the systems incorporating the remote-control data into the micro-computer, a delay of the system operation is inevitable when the frequency of the interruption process is excessively increased.

SUMMARY OF THE INVENTION

A remote control circuit is disclosed which is operable at high processing speeds without being affected by external noises. The remote-control signal receiver is comprised of:

input means to input remote-control signals consisting of data trains repeated at a predetermined frequency;

data incorporating means by which the remote control data extracted from the remote-control signal is incorporated into a micro-computer by means of the input means;

setting means by which the blank period between the data trains of the remote-control signal incorporated by means of said input means is set; and limiting means to limit the data incorporating process performed by the data incorporating means.

Furthermore, reliable and high-speed operation of the setting means is attained by providing a memory means which predicts and stores the length of the blank period derived from the pulse trains.

Moreover, reliable processing is realized by the setting means which detects "leader pulses" contained in the remote-control signal, and predicts the period between the end of the incoming data train and the succeeding leader pulse as a blank period.

In an exemplary embodiment of the present invention, noise detecting means is used to detect and extract the noises mingled within the remote-control signal. Furthermore, the data incorporation limiting period or the level of the limiting means is controlled according to the output of the noise detecting means. Thus, the remote-control signal receiving system can be protected against external noises in accordance with the magnitude of the noise.

The remote-control signal consisting of plural data-trains transmitted from a remote-control transmitter is inputted into the remote-control signal receiver having an above-described circuit construction through the input means. The remote-control data decoded from the remote-control signal is incorporated into the receiver circuit through the data incorporating means, and the setting means determines the data-blank period between the data-trains from the data, and sets the blank period at the receiver.

Then, the data incorporating operation performed by the data incorporating means is limited during the blank period set by the setting means. In this manner, the incorporation of the inputted data is prohibited for an optimum blank period, so that no malfunction of the circuit caused by external noises is possible, and the micro-computer is able to perform processes other than the remote-control signal processing during the blank period.

Furthermore, by limiting the level of the data incorporation performed by the limiting means, the data processing in accordance with the level of the external noise can be performed. Therefore, a remote-control signal receiver having a high-processing speed and being unaffected by the external noise can be attained.

Although the data-blank period depends on the individual remote-control transmitter, the length of the blank period for the receiver can be set by the setting means upon identifying the data-blank period from the predetermined transmitter code signal stored in the memory means, so that the length of the blank period can be treated as a known value within the remote-control signal receiver.

Therefore, the setting means is able to predict the length of the blank period from the remote-control signal, and the length of the predicted blank period is stored in the memory means.

For example, in the case of a remote-control code constructed on a format determined by the Home-Appliance Association, the data-blank period between the data trains is called the "trailer period", and the length of that period is approximately 75 millisec.

The justification of the received remote-control code if it is an authentic remote-control code set by the Home-Appliances Association for home appliances is performed by confirming if it is normal data without errors after receiving a series of remote-control signals. Therefore, the time at which a next series of remote-control signals would be received is predicted by the setting means which identifies the type of the remote-control signal transmitter.

Therefore, a period slightly less than (e.g., 90%) the data-blank period is determined as a blank period for the receiver by means of the setting means, and the limiting means limits the remote-control data incorporation level or suspends the data incorporating operation during the thus determined blank period for the receiver.

Thus, a remote-control signal receiver having a high processing speed and which is insensitive to external noises can be attained and the efficiency of processing can be substantially improved by the noise detecting means which adjusts the limiting level and the length of the blank period of the receiver according to the output of the noise detecting means or the condition of the noise.

DETAILED DESCRIPTION OF THE INVENTION

Figure 1:
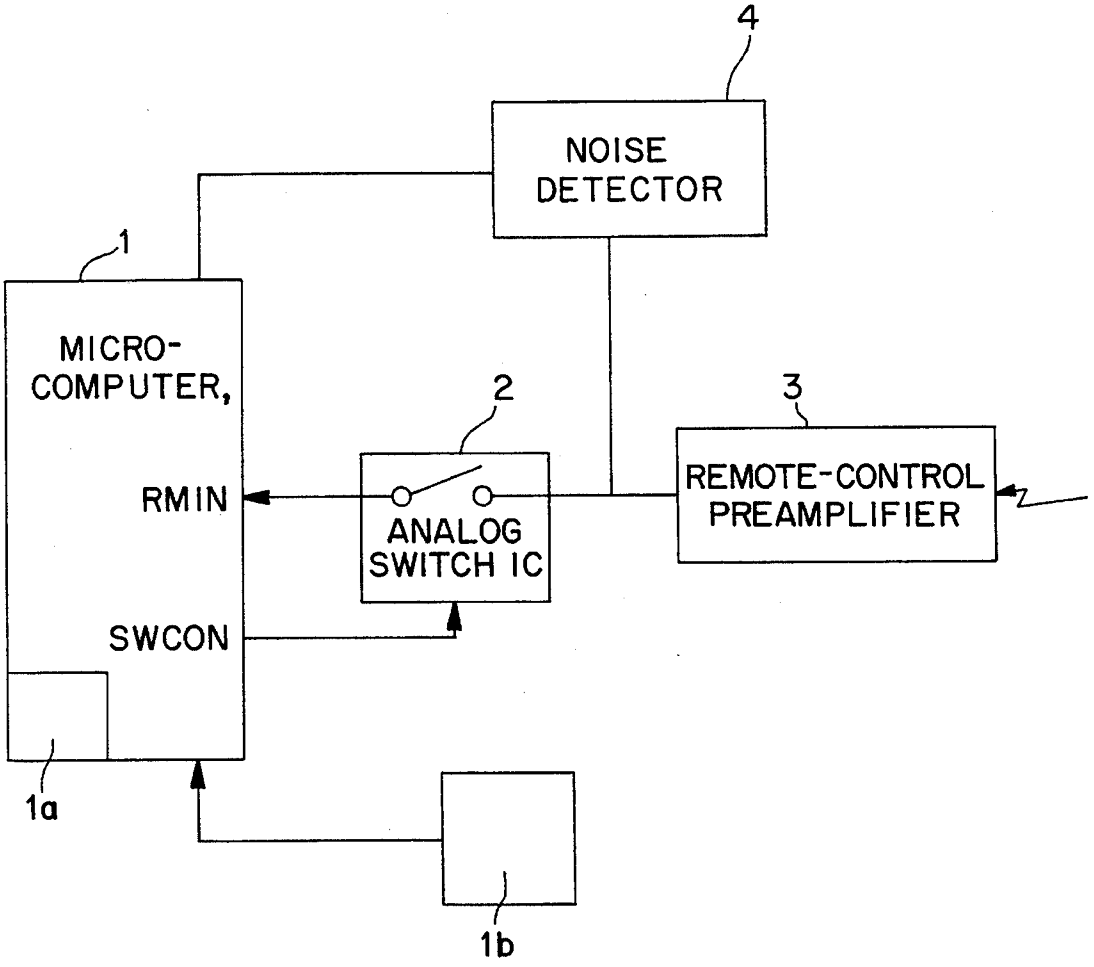
FIG. 1 shows a block diagram of an exemplary embodiment of a remote-control signal receiver in accordance with the invention.

An exemplary method to realize a remote-control signal limiting means can be realized, for instance, by providing an analog switch IC at the remote-control data incorporating terminal of the micro-computer, and setting the switch to OFF status during the blank period, or by prohibiting the interruption of the micro-computer during the blank period.

With electronic appliances with remote-control signal receiving functions implemented by a micro-computer, the pulses of remote-control signals are inputted into the external interruption (positive or negative edge interruption) terminal of the micro-computer. Triggered by the edge, the edge-to-edge time is determined by an internal timer provided within the micro-computer. Based on this time, the remote-control data are incorporated into the internal register of the micro-computer.

The format of the remote-control signal set by the Home-Appliances Association such as shown in FIGS. 2 and 3A–3C is possible in this case. The data train of the remote-control signal consists of a "leader pulse" lasting for a period of 4.5 millisec and a succeeding series of 6-byte data.

And, after a 75 millisec data-blank period called "trailer", the same leader pulse and the same series of 6-byte data train are followed, and this cycle is repeated.

When the incorporation of the remote-control data into the micro-computer is made, data incorporation is started right after the detection of the "leader pulse".

The conventional micro-computer has been set at a ready condition or waiting condition until the reception of the succeeding "leader pulse" right after the incorporation of the last byte of data is made.

That is, if a normal remote-control signal is inputted into the micro-computer, a data-blank period contained in the signal lasting until the next "leader pulse" which indicates the starting of the succeeding data pulse train is detected by the micro-computer, and the blank period for the receiver is set accordingly, or it can be detected by the micro-computer as a known value by referring to the remote-control code stored in the memory in advance.

In a case where the code of the remote-control signal transmitted from a transmitter is displayed on a display device which can be visually confirmed, the blank period can be set automatically by inputting the displayed code into the micro-computer by using an instruction means.

The input of noise can be isolated completely during the blank period if the remote-control code input terminal is isolated from the circuit by means of the limiting means so that the chances of a malfunction are reduced. The actual timing to set the blank period during which the remote-control code input terminal is isolated is begun right after (shown by the point-A in FIG. 2) the incorporation of the entire 6-byte data train shown in FIG. 2. The timing to resume the incorporation of the succeeding data is set at a time when about 90% of the trailer period is elapsed (shown by the point-B).

In this manner, no interruption of the micro-computer which is caused by noise was received by the circuit during the blank period, and thus no data discrimination of the leader pulse and the data pulse has to be performed. This also eliminates unnecessary operation and malfunction of the circuit even if quasi leader pulses or quasi data pulses are introduced into the circuit.

In the above-explained embodiment, although a limiting means by which the data incorporation is digitally prohibited during the blank period is disclosed, the same effect can be obtained by limiting the data incorporation level by an analog means. Moreover, the data-blank period can be adjusted at a better optimum value by changing the width of the blank period according to the magnitude of the external noise.

An exemplary embodiment of the present invention is shown in FIG. 1 in which 1 is a micro-computer, 2 is an analog switch IC, and 3 is a remote-control preamplifier.

In FIG. 1, the remote-control signal (e.g. infra-red signal) is inputted into the remote-control preamplifier 3 acting as an input means, and is inputted in the Remote Control Signal Input (RMIN) terminal of the micro-computer 1. Between the remote-control amplifier 3 and the micro-computer 1, an analog switch IC 2 acting as a control means is provided, and this is controlled by a signal derived from the Switch Control (SWCON) terminal of the micro-computer 1.

The RMIN terminal of the micro-computer 1 is an external interruption terminal, and the interruption can be triggered by the rising edge of the incoming pulse. FIG. 3 shows a remote-control signal standard determined by the Home-Appliance Association. By using this, the leader "0" or "1" in the data train can be detected at the rising edge of the pulse.

The micro-computer 1, acting as a data incorporating means, conducts both the interruption process of these information triggered by the rising edge, and the data incorporation by using an internal timer having a resolution of 20 microsec.

Figure 2:
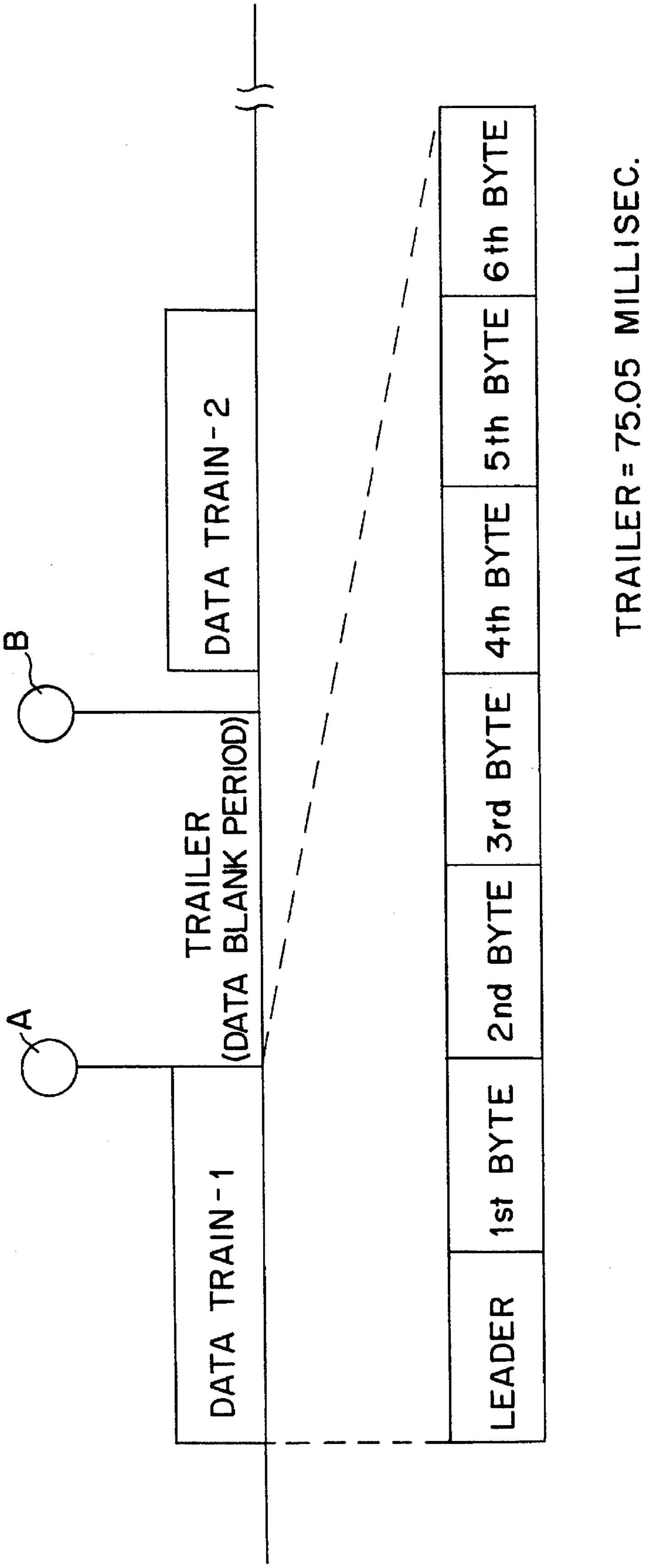
FIG. 2 shows a typical format of a remote-control signal set by the Home-Appliance Association.
Figure 3A:
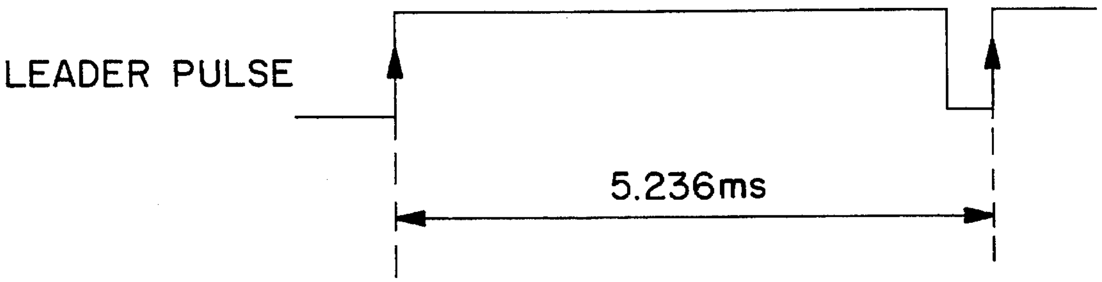
FIGS. 3A–3C show a waveform of the pulses arranged in the remote-control signal format.
Figure 3B:
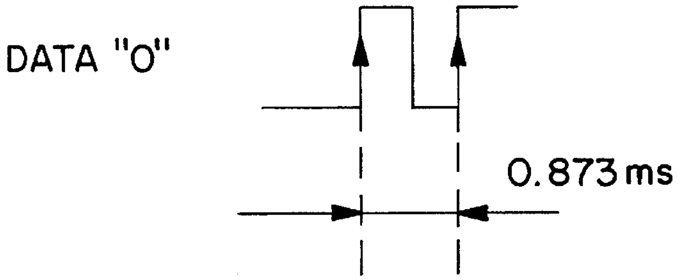
Figure 3C:
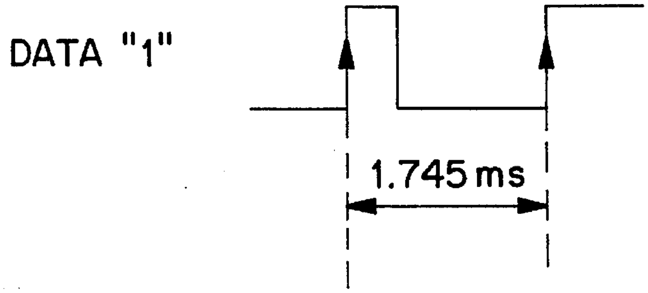

Although the memory means 1*a* is programmed in advance to receive only the remote-control code having a format specified by the Home-Appliance Association shown in FIG. 2, the remote-control code may be programmed by means of another instruction means 1*b* such as a keyboard.

In conducting the incorporation of the "data train-1" of the remote-control signal, the micro-computer 1 detects the leader pulse first, and the data incorporation is commenced as soon as the data are detected as shown in FIG. 2, and the 6-byte data after the leader pulse are successively incorporated thereafter.

The point-A in FIG. 2 shows the point at which the incorporation of all the 6-byte data is completed. At point-A, the analog switch IC 2 acting as a limiting means is turned OFF prohibiting the incorporation of the remote-control signal into the micro-computer 1 thereafter.

Then, the micro-computer 1 acting as a setting means sets a period from that point to a point 68 millisec behind the point-A shown by the point-B in FIG. 2 as a blank period. According to the remote-control code conforming to the Home-Appliance Association which is programmed or inputted in advance, this limit is released by turning the analog switch IC 2 ON at the point-B by means of the micro-computer 1 acting as a limiting means this time, so that the remote-control signal becomes once again accepted at the RMIN terminal of the micro-computer 1.

After turning the analog switch IC 2 ON, the incorporation of the data train-2 is commenced according to the previously described procedure starting from the detection of the leader pulse. After that, the remote-control signal is prohibited from the RMIN terminal for the period set before, and this prohibition is released allowing the incorporation of the remote-control signal thereafter according to the procedures set forth above.

In this exemplary embodiment of the present invention, these procedures are repeated whenever the remote-control signal arrives at the receiver, and the value of 68 millisec set as the blank period corresponds to about 90% of the trailer period. This, in turn, corresponds to the data-blank period for a remote-control signal as specified by the Home-Appliance Association.

As indicated above, chances of erratic incorporation of data such as external noise which typically occur during the data-blank period, or miss-discrimination of the remote-control signal by the micro-computer 1 are now completely eliminated by turning the analog switch IC 2 OFF.

In this exemplary embodiment, although an analog switch IC 2 has been shown as a means to prohibit the remote-control signal when it is turned OFF, the same objective can be accomplished actually by prohibiting the function of interruption terminal of the micro-computer 1 by means of software.

Furthermore, though explanations in this case have been made only for the data train of the remote-control signal comprised of a leader pulse and 6-byte data, the same effect can be obtained with any remote-control signal having a data-blank period regardless of the data train construction.

As explained above, several problems with conventional remote-control signal receivers (such as malfunction caused by external noise) can be eliminated by employing a remote-control signal receiver in accordance with the present invention.

That is, the probability of erratic operation of a remote-control can be substantially reduced attaining high practical benefits by performing reliable data incorporation during the data period of the remote-control signal while the data incorporation is prohibited during the data-blank period containing no data therein.

The remote-control signal receiver may also have a noise detecting means 4 for detecting and extracting noise mingled with the remote-control signal. In response to the detected and extracted noise, the receipt of remote control data is limited in time and by signal level according to an output from the noise detecting means. This is accomplished by adjusting the limiting level and the length of the blanking period of the receiver in response to the noise detecting means 4.

Furthermore, since the micro-computer incorporated in the receiver is so designed that the data incorporation cannot be performed during the data-blank period, and the loss of time caused by unnecessary interruption can be avoided, operation of the micro-computer at a substantially high speed is possible.

What is claimed:

1. A remote-control signal receiver, comprising:

input means to input a remote-control signal, said remote-control signal including a blank period and pulse data train which is started with a leader pulse and is repeated at a predetermined frequency to form a plurality of data trains;

data incorporating means for receiving remote control data which is included in said blank period and pulse data train;

setting means by which a blank period started from a final pulse of said data-train included in remote-control signal and ended with a leader-pulse of succeeding data train inputted by said input means are set; and limiting means to limit receipt of pulse data trains by said data incorporating means during the blank period set by said setting means.

2. A remote-control signal receiver according to claim 1, wherein said setting means includes memory means for detecting, predicting, and storing the length of said blank period.

3. A remote-control signal receiver according to claim 2, wherein said setting means detects a leader pulse in the pulse data train of the remote-control signal, and detects a time period starting from an end of one of said plurality of pulse data trains succeeding said leader pulse to a next leader pulse as a blank period.

4. A remote-control signal receiver according to claim 1, wherein the data train of said remote-control signal includes pulse trains which include a leader pulse.

5. A remote-control signal receiver according to claim 4, wherein said setting means detects said leader pulse contained in the remote-control signal, and measures as a blank period a time period starting from the fall of last leader pulse of the succeeding pulse train to the rise of leader pulse of the next data train determined by a counter.

6. A remote-control signal receiver according to claim 1, wherein said setting means includes instruction means for setting said blank period.

7. A remote-control signal receiver according to claim 6, wherein said setting means includes switching means for setting a plurality of blank periods.

8. A remote-control signal receiver according to claim 1, further including noise detecting means for detecting noises included in said remote-control signal, wherein receipt of remote control data is further limited by a time period in accordance with an output signal generated by said noise detecting means during a blank period.

9. A remote-control signal receiver according to claim 1, further including noise detecting means for detecting noises included in said remote-control signal, wherein receipt of remote control data is further limited by a signal level in accordance with an output signal generated by said noise detecting means during a blank period.

10. A remote-control signal receiver according to claim 1, wherein said limiting means includes prohibiting means completely prohibiting receipt of remote control data.

* * * * *